Feb. 14, 1956  W. S. BAER, SR  2,734,527
CONSTANT PRESSURE CONTROL VALVE
Filed May 22, 1952  2 Sheets-Sheet 1

INVENTOR.
WALTER S. BAER, SR.
BY
ATTORNEYS

Feb. 14, 1956  W. S. BAER, SR  2,734,527
CONSTANT PRESSURE CONTROL VALVE

Filed May 22, 1952  2 Sheets-Sheet 2

INVENTOR.
WALTER S. BAER, SR.
BY
H. H. Garringer
ATTORNEYS 2,734,527
Patented Feb. 14, 1956

2,734,527
CONSTANT PRESSURE CONTROL VALVE

Walter S. Baer, Sr., Yeadon, Pa.

Application May 22, 1952, Serial No. 289,419

8 Claims. (Cl. 137—506)

(Granted under Title 35, U. S. Code (1952), sec. 266)

The invention described herein may be manufactured and used by or for the Government of the United States of America for governmental purposes without the payment of any royalties thereon or therefor.

This invention relates to a balanced constant pressure control valve and it particularly relates to a metering control valve which is adapted to be used in the hydraulic, ratio-controlled metering system of an aircraft arresting engine. The general purpose of this invention is to provide means for efficiently dissipating the kinetic energy of an airplane that is being arrested on the flight deck of an aircraft carrier. This invention is an improvement over older type valves employing the ordinary globe valve seat principle. With the advent of larger, heavier, jet-propelled aircraft, these older forms of valves became too large and did not give satisfactory service. Many attempts were made to develop a satisfactory metering sleeve valve for this purpose and such valves were produced wherein the sleeve was provided with an internal seat and many V-shaped packing rings. However, the highly pressurized fluid required such tight packings that excessively high internal friction was produced, with such consequently erratic seat reactions, that tests gave very unsatisfactory indicator pressure curves and erratic operation of the sleeve valve and indicated an uneven decelerated speed for an airplane being arrested; in addition, the static inertia and high internal friction pressures necessitated larger and heavier ratio setting lever mechanism to control the sleeve valves travel for metering purposes.

This invention, which eliminates the use of internal seats, the use of internal V-packing rings or other such static inertia and friction producing elements and the necessitated maintenance work, comprises a control valve of the open-ended, hollow sleeve type wherein there are arranged a series of staggered metering openings or orifices around the periphery of the sleeve, these orifices being adapted to mate with a corresponding series of openings in the wall of an annular chamber surrounding the sleeve. The sleeve is mounted on a stem or shaft one end of which is exposed to a stream of the fluid under pressure which comes from the annular chamber and ram cylinder of the arresting engine. The other end of the valve stem is connected to a counter-acting, ratio setting pressure means. When the fluid under pressure acts on one end of the stem, it moves the sleeve axially so that the orifices in the sleeve move toward mating position with the orifices in the chamber wall. As the orifices in the sleeve mate with those in the chamber wall, some of the fluid from the annular chamber bleeds through these orifices and flows at a reduced pressure through a check valve to the storage tank or "accumulator." When the fluid pressure is sufficiently reduced, the counter-acting pressure on the other end of the valve stem acts to restore the sleeve valve to its original position.

The principal object of this invention is to provide a means for dissipating the kinetic energy of an aircraft that is being arrested by the cable receiving system of the hydraulic arresting engine.

Another object of this invention is to provide a means for reducing the pressure of the fluid in the hydraulic ram cylinder of the arresting engine.

Another object of this invention is to provide an orificed sliding sleeve type valve means for keeping the pressure constant in the hydraulic ram cylinder.

A further object of this invention is to eliminate the use of packing on the sliding sleeve, thereby eliminating much friction.

Still another object of this invention is to provide a means to prevent return of liquid through the hydraulic system with resultant walk back of an arrested aircraft.

A still further object of this invention is to materially reduce the total size and weight of the control valve.

Other objects and many of the attendant advantages of this invention will be readily appreciated as the same becomes better understood by reference to the following detailed description when considered in connection with the accompanying drawings wherein:

Fig. 3 is an external view of the valve sleeve showing the staggered arrangement of the orifices.

Figure 1:
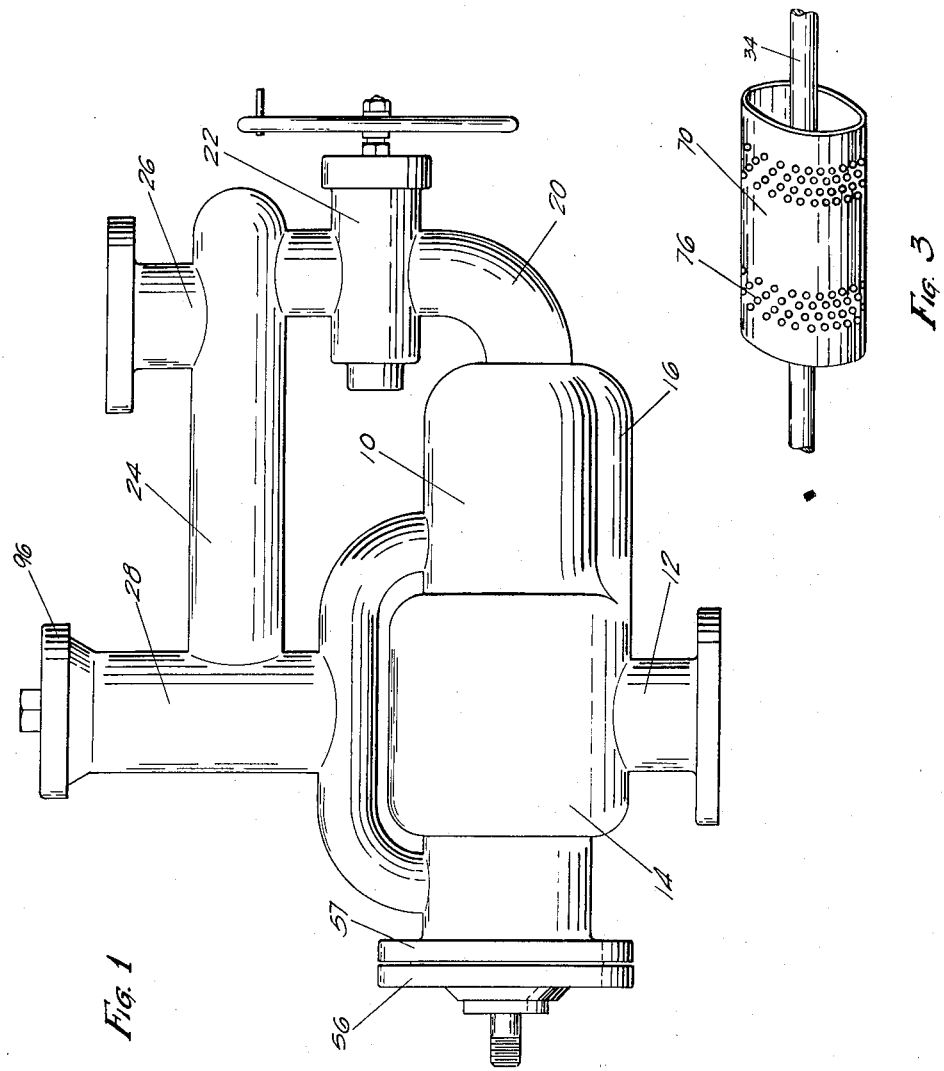
Fig. 1 is an elevational external view of the invention.
Figure 2:
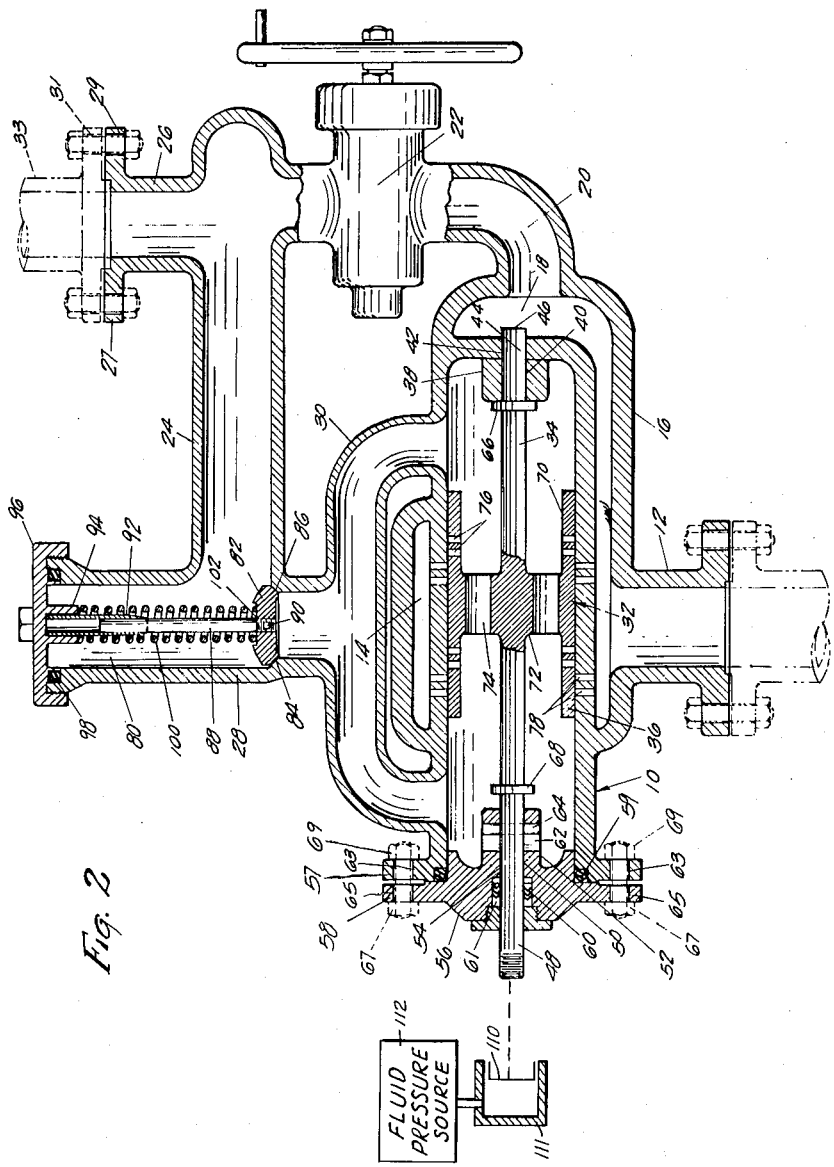
Fig. 2 is a view partly in section and partly in elevation, illustrating in detail the parts of the device shown in Fig. 1.

Referring in detail to the drawings wherein is shown the preferred embodiment of this invention, the constant pressure valve housing is shown at 10. An inlet pipe 12 leads into the housing from the "ram" cylinder of the arresting engine which is not here shown. The housing 10 is encircled by an annular chamber 14 from which extends a conduit 16 one wall of which is formed by the annular wall of the housing 10. The conduit 16 extends around to the rear of the valve housing to form a chamber 18. Leading from the chamber 18 is a bent pipe 20 in which is provided a by-pass valve generally designated 22. The details of this valve are not shown since they form the basis of a separate invention. The pipe 20 extends beyond valve 22 to connect with a perpendicularly arranged pipe 24 from which extends a pipe connection 26. The connection 26 is provided with a flange 27 having holes 29 adapted to receive bolts 31 for coupling the connection 27 to a conduit 33 leading to a storage tank or "accumulator," not shown.

The pipe 24 extends parallel with the housing 10 and connects with a U-shaped conduit 30 which overlies the annular chamber 14. The legs of the U-shaped conduit are in communication with the interior of the housing 10.

A sleeve valve, generally designated 32, is provided in the housing 10, and this sleeve valve comprises a valve stem 34 upon which is mounted a sleeve 36. A boss 38 is provided on one end of the housing wall within the interior of the housing and this boss 38 is provided with an opening 40 which coincides with an opening 42 in the wall of the housing. The end 44 of stem 34 extends through the coinciding openings 40 and 42 and projects slightly into chamber 18 as shown at 46.

The other end 48 of the valve stem projects through an opening 50 in a boss 52 and through an opening 54 in a closure member 56. The open end of housing 10 is provided with a flange 57 and the closure 56 is provided with a flange 58. An O-ring 59 is arranged between the open end of the housing and the closure member 56. A series of V-rings 60 are provided in a groove or counterbore 61 surrounding the opening 54. The boss 52 is provided with an elongated slot 62 in which rides a pin 64 which is connected to stem 34. The purpose of this pin is to align the orifices in the sleeve with the orifices in the housing. A plurality of holes 63 in flange 57 and plurality of holes 65 in flange 58 are adapted to coincide to receive a plurality of locking bolts 67. Nuts 69 hold the locking bolts in position. A stop 66 is provided at one end of the valve stem and a stop 68 is provided at the other end. These stops are adapted to abut against their respective bosses 38 and 52, thereby limiting the end-wise movement of the valve stem in either direction.

The sleeve 36, which is integral with the stem and which is arranged centrally of the stem, comprises a cylindrical member 70 and a connecting member 72 which connects the cylindrical member to the valve stem. The connecting member 72 is provided with ports 74 for a purpose to be hereinafter explained. The cylindrical member 70 is further provided with a double set of quadruple rowed orifices 76 arranged in staggered relationship in similar manner to the orifices 78. These orifices 78 connect the interior of housing 10 with the annular chamber 14.

Provided in the housing 28 is a check valve 80 comprising a valve disc 82 which is provided with a beveled edge 84 which is adapted to seat against a complementary beveled valve seat 86 which is formed in the housing. The valve disc 82 is connected to a valve stem 88 by a pin 90. The stem 88 extends into a tube 92 which is, in turn, press-fitted into a sleeve 94 depending from a gland cap 96. The connection between the open end of the housing 28 and the gland cap 96 is sealed by means of an O-ring 98. A light coil spring 100 is arranged exteriorly of the tube and stem and between the sleeve 94 and a recess 102 in the top of the valve disc. This spring acts to bias the valve disc toward closed position upon the valve seat.

In operation, when an airplane lands and is caught by its arresting hook, the momentum of the plane carries the hook and engaged deckpendant along with it. The cable is connected through fairlands to the arresting engine crosshead, which in turn is bolted to the "ram" that slides in a cylindrical tube. A fluid is provided in the tube at one end of the ram and when the plane is caught and carries the cable along, the ram is thrust back thereby placing the fluid under great pressure. This fluid under pressure is then forced into the annular chamber 14 of the valve and flows from this chamber through conduit 16 into chamber 18. The pressurized fluid in chamber 18 applies a force against the portion 46 of the valve stem 34 which causes the stem to move backward. As the valve stem moves backward it carries the attached valve sleeve in the same direction, the backward movement of the valve being limited by the stop 68. As the sleeve moves backward, the staggered orifices 76 in the sleeve commence to coincide with the corresponding orifices 78 in the chamber wall, thereby allowing some of the pressurized fluid coming from the ram cylinder to flow through the valve housing and into the U-tube 30. This fluid then lifts the check valve 80 from its seat and flows through the pipe 24 to the accumulator.

The metering of the pressure fluid through the orifices 76 and 78 relieves the pressure against the portion 46 of the valve stem and allows the counter-force which is constantly being applied to the opposite end of the stem to tend to move the valve back toward its normal position, thus keeping the pressure constant until the stroke of the ram is completed, reducing the cylinder pressure to accumulator pressure; this return movement of the stem being limited by stop 66. It should be noted here that the ports 74 in the member 72 allow the fluid in the valve housing to be maintained at equal pressure on both sides of the valve sleeve also lightening the weight of the sleeve.

Although the counter-force mentioned above is shown produced herein by means of the piston 110 to which the valve stem 34 is secured, the cylinder 111 in which the piston reciprocates, and the fluid pressure source 112 which biases the piston and the valve stem toward its leftmost position, it is to be understood that any other suitable apparatus such as an adjustable spring, a weight, or a hydraulic or pneumatic device could be used without departing from the spirit or scope of the present invention.

The details of a specific type of such apparatus is fully disclosed in and form the basis of a copending application of Walter S. Baer et al., Serial Number 312,423, filed September 30, 1952. As disclosed in that application the extent of the counter force is adjusted according to the weight of the aircraft being arrested, since a heavy plane will tend to pull the cable along with a greater force than will a lighter plane and the cable will, in turn, tend to thrust the "ram" back with a greater force, thereby placing the fluid under a greater pressure.

The necessary pressure drop in the pressure fluid is kept constant for both heavy and light planes, since the pressure of the counter-force means is set to a predetermined value, greater or smaller, depending on the weight of the plane. Since this constant relationship is in effect, the total amount of fluid required to be metered off to cause the pressure drop is kept constant. When a heavy plane is being arrested and the fluid is under greater pressure, the sleeve valve is caused to move back only enough to partially mate the orifices 76 and 78. When a light plane is being arrested, the orifices will tend to fully mate. This is because the same amount of fluid under a greater pressure will flow through a smaller orifice as will flow through a larger orifice when the pressure is less.

After the excess pressure fluid has been metered off and the sleeve valve has been returned to its original position, the by-pass valve 22 may be opened to allow the fluid to return to the "ram" cylinder from the "accumulator," thereby forcing the ram and crosshead back to the original battery position. The arresting engine is then, again, ready to arrest an incoming plane.

Obviously many modifications and variations of the present invention are possible in the light of the above teachings. It is, therefore, to be understood that within the scope of the appended claims the invention may be practiced otherwise than as specifically described.

What is claimed is:

1. A valve means comprising a housing, a wall in said housing dividing said housing into a communication chamber and a valve chamber, means in said housing opening into said communication chamber to provide access to a source of fluid pressure, said wall having an aperture provided therein opening into said communication chamber, a hollow, open-ended sleeve mounted in said valve chamber for reciprocatory movement, the means mounting said sleeve for said movement including a valve stem passing through the center thereof and integral therewith, one end of said valve stem projecting through said aperture into said communication chamber, a plurality of orifices formed in said wall, said sleeve being positioned on said stem to overlie the wall orifices at all times, a plurality of orifices formed in the periphery of said sleeve and positioned to coincide with said wall orifices in some positions of its reciprocatory movement, a force applying means acting on one end of said valve stem and opposing the force of the fluid pressure from said fluid pressure source, fluid passage means communicating with said valve chamber.

2. The valve means of claim 1 wherein the orifices on the periphery of said sleeve are arranged in a series of rings coaxial with the axis of said sleeve and wherein the orifices in the wall of said housing are arranged in a series of rings coaxial with said first mentioned rings.

3. The valve means of claim 2 wherein the orifices in each of said rings are arranged in staggered relation with each other.

4. The valve means of claim 1 wherein said sleeve is connected to said valve stem by a connecting web, said web having a series of openings therein, said openings being constructed and arranged to allow a fluid to flow therethrough from one end of said sleeve to the other end whereby the pressure on both ends is maintained equal.

5. The valve means of claim 1 wherein said sleeve has a length which is substantially less than the length of said valve chamber and wherein the fluid passage leading from said valve chamber comprises a U-shaped conduit, the legs of said U-shaped conduit communicating with the interior of said valve chamber at areas located between the ends of said sleeve and the ends of said valve chamber.

6. The valve means of claim 1 wherein a pair of stops are provided on said valve stem, said stops being constructed and arranged to limit axial movement of said valve stem in either direction.

7. A valve device comprising a main housing forming a chamber, a fluid inlet passage leading into said chamber, a fluid outlet passage from said chamber, a valve housing within said chamber, a second chamber provided at one end of said outlet passage adjacent one end of said valve housing, a generally U-shaped conduit in fluid connection with said valve housing, one leg of said generally U-shaped conduit being connected to said valve housing adjacent one end of said valve housing and the other leg of said conduit being connected to said valve housing adjacent the opposite end thereof, a fluid reservoir connected to the U-shaped conduit, a sleeve-type valve within said valve housing, said valve comprising an axially movable stem upon which is mounted a cylindrical sleeve intermediate the ends of said stem, one end of said stem projecting through said valve housing into said second chamber and the opposite end of said stem projecting through that end of said valve housing which is opposite said second chamber, whereby pressure fluid in said second chamber may impinge upon the said one end of said stem to move said valve in one direction, means applying a force to the said opposite end of said stem to move it in the opposite direction, a plurality of orifices formed in one wall of said valve housing, and a plurality of orifices in said cylindrical sleeve which are adapted to coincide with a said plurality of orifices in the wall of said housing upon movement of said valve to a predetermined position relative to said valve housing.

8. A valve means comprising a cylindrical valve housing defining a valve chamber, an outlet conduit from said valve chamber, two groups of orifices on the periphery of said housing leading from said valve chamber, one of said groups being spaced from the other of said groups longitudinally of said housing, a first outer chamber surrounding said housing, a second outer chamber adjacent one end of said housing, said first and second outer chambers being in fluid communication with each other, a conduit connected to said first outer chamber, a valve in said valve chamber, said valve comprising a cylindrical sleeve having two groups of orifices arranged in relation to each other similarly to the orifices in said housing, a web centrally positioned within said sleeve and fixed to the inner surface thereof, a valve stem connected to said web intermediate the ends of said stem, and extending axially outwardly of either end of said sleeve, one end of said stem extending through an opening in one end of said housing into said second outer chamber while the opposite end of said stem extends through an opening in the opposite end of said housing, said one end of said stem being adapted to be acted upon by fluid pressure within said second outer chamber to move said sleeve axially in one direction while said opposite end of said stem is adapted to be connected to a means for moving said sleeve axially in the opposite direction, said moving means comprising force applying means operative when the fluid pressure in said second outer chamber falls below a predetermined minimum, there being a boss provided on said housing within said valve chamber through which said stem extends, said boss having a slot therein, said a pin fixed on said stem and positioned within said slot, said pin and slot being adapted to prevent rotational movement of said valve.

References Cited in the file of this patent

UNITED STATES PATENTS

| Number | Name | Date |
|---|---|---|
| 60,378 | Hunt | Dec. 11, 1866 |
| 328,062 | Power | Oct. 12, 1885 |
| 706,616 | Watson | Aug. 12, 1902 |
| 836,347 | Tittelbach | Nov. 20, 1906 |
| 1,023,843 | Hall | Apr. 23, 1912 |
| 1,567,612 | Pascale | Dec. 29, 1925 |
| 1,679,257 | Neebe | July 31, 1928 |
| 1,819,422 | Kiger | Aug. 18, 1931 |
| 2,247,734 | Schreiber | July 1, 1941 |
| 2,353,306 | Henry | July 11, 1944 |
| 2,380,631 | Cones | July 31, 1945 |
| 2,573,680 | Arnold | Nov. 6, 1951 |